United States Patent [19]
Knapke

[11] 3,987,750
[45] Oct. 26, 1976

[54] FREE STANDING STRIP OILER AND FEEDER

[75] Inventor: David M. Knapke, Sidney, Ohio

[73] Assignee: Perfecto, Inc., Piqua, Ohio

[22] Filed: May 16, 1975

[21] Appl. No.: 578,142

[52] U.S. Cl. .................................. 118/5; 118/119; 118/206; 118/249; 118/259; 118/325; 118/44
[51] Int. Cl.² ...................... B05C 1/08; B05C 11/02; B05C 5/00
[58] Field of Search ............... 118/206, 5, 249, 259, 118/44, 304, 325, 119, 75; 72/43, 44, 45, 46

[56] References Cited
UNITED STATES PATENTS 2,555,021  5/1951  Backus ............................ 118/206 X

*Primary Examiner*—John P. McIntosh
*Attorney, Agent, or Firm*—Witherspoon and Lane

[57] ABSTRACT

A free standing strip oiler and feeder adapted to oil both sides of a metal strip and feed it to a press comprising coacting powered feed rolls which receive and feed a strip to a straightening roller followed by means for coating the upper surface of the strip with lubricant, a pair of coacting squeegee rolls for smoothing the lubricant on the upper surface of the strip, means for coating the underside of the strip with lubricant and a further roll for finally smoothing the oil on the upper surface of the strip. The oiler and feeder unit is provided with a system for returning excess oil to an oil reservoir which is heated to maintain the oil at the proper and desired flow standards.

9 Claims, 4 Drawing Figures

FREE STANDING STRIP OILER AND FEEDER

SUMMARY OF THE INVENTION

This invention relates to the oiling of a strip of metal fed to a press and, more particularly, to an oiler and feeder combination having its own power for independent operation.

In the drawing of metal into cup forms by means of a press, it is necessary that a uniform film of lubricant be applied to both surfaces of the metal strip prior to the drawing operation. The present invention is basically directed to the application and distribution of lubricant on the metal strip by means that will insure a smooth and continuous coating on both the upper and underside of the strip. Many difficulties have been experienced by prior art oilers and feeders in that when the requisite feed speeds were used the coating of lubricant on both surfaces of the metal strip was not continuous and smooth as required. In applicant's machine the temperature of the lubricant is controlled to make certain that the necessary flow and spread characteristics of the lubricant are provided so that the coating components can properly apply lubricant to both sides of the metal strip.

In view of the foregoing, it is an object of this invention to provide a machine for oiling both sides of a metal strip and feeding it to a press.

It is another object of this invention to provide a machine for oiling and feeding a metal strip wherein the lubricant is maintained in a state where it will flow evenly and smoothly over the strip surfaces.

It is yet another object of this invention to provide apparatus for oiling and feeding a metal strip wherein means are provided for controlling the quantity of lubricant applied to the surfaces of the metal strip.

The above and additional objects and advantages will become more apparent when taken in conjunction with the following detailed description and drawings showing by way of example a preferred embodiment of this invention.

IN THE DRAWINGS

FIG. 1 is a front elevational view partly in section illustrating the entire oiler and feeder combination, FIG. 2 is a sectional view taken along line 2—2 of FIG. 1 and shows further details of the oiler and feeder combination, FIG. 3 is a top plan view illustrating the positioning of the various rolls, and FIG. 4 is a perspective view showing further details of the machine.

DETAILED DESCRIPTION OF THE INVENTION

Figure 1:
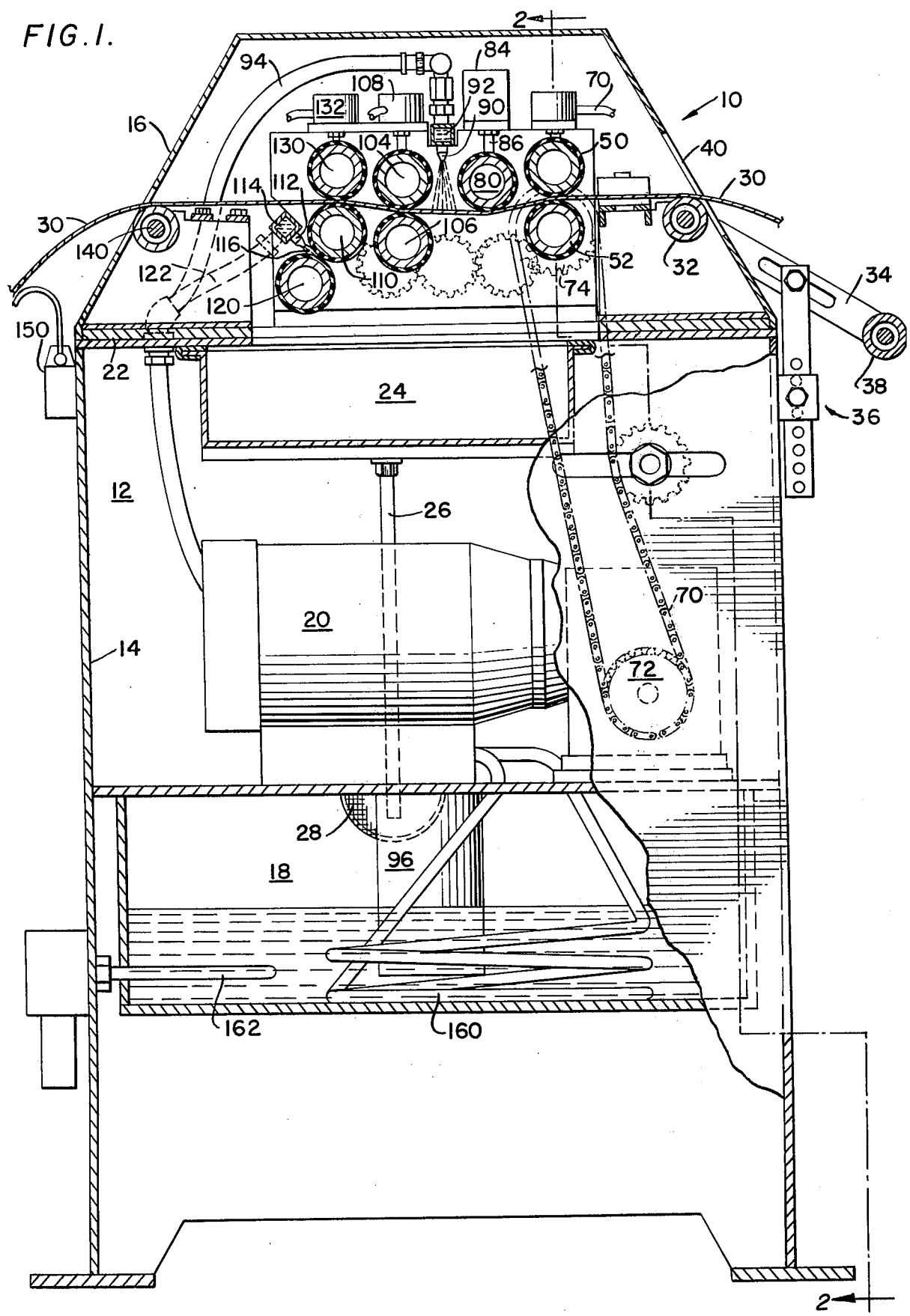

Referring to FIG. 1 of the drawings, the oiling and feeder apparatus 10 comprises a base assembly 12 which includes a rectangular lower housing 14 and an upper movable cover 16. A lubricant reservoir 18 is positioned in the lower portion of the lower housing 14 while a power source 20 is mounted in the same housing above the reservoir 18. A base 22 fits over the upper end of the housing 14 and acts as a support for the various components of the feeding and oiling elements. A lubricant collecting chamber 24 is attached to the base 22 and extends down into the housing 14. A return conduit 26 feeds lubricant from chamber 24 back to the reservoir 18 after passing through filter 28.

The metal strip 30 is initially positioned by guide roll 32 which is adjustably carried by slotted arms 34 in turn supported by bracket assemblies 36 affixed to the housing 14. The bracket assemblies 36 provide vertical adjustability while the slotted arms furnish fore and aft variability. The outward ends of arms 34 support another guide roll 38 which may be needed depending upon the relative positioning of the strip reel and the oiling and feeding machine. The upper housing or cover 16 is apertured at 40 to allow introduction of the metal strip 30 to the feed rolls and oiling stations.

Figure 2:
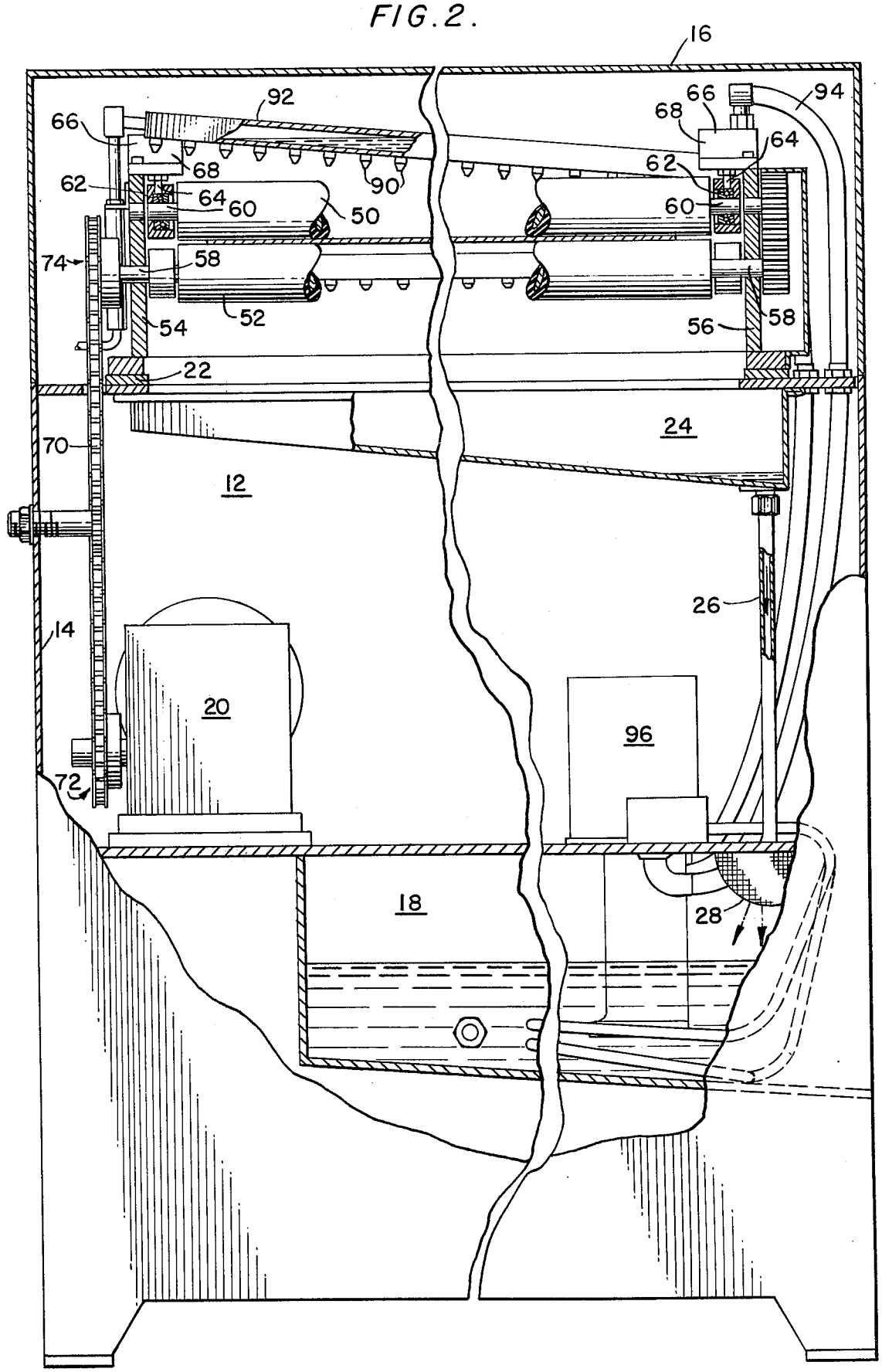
Figure 3:
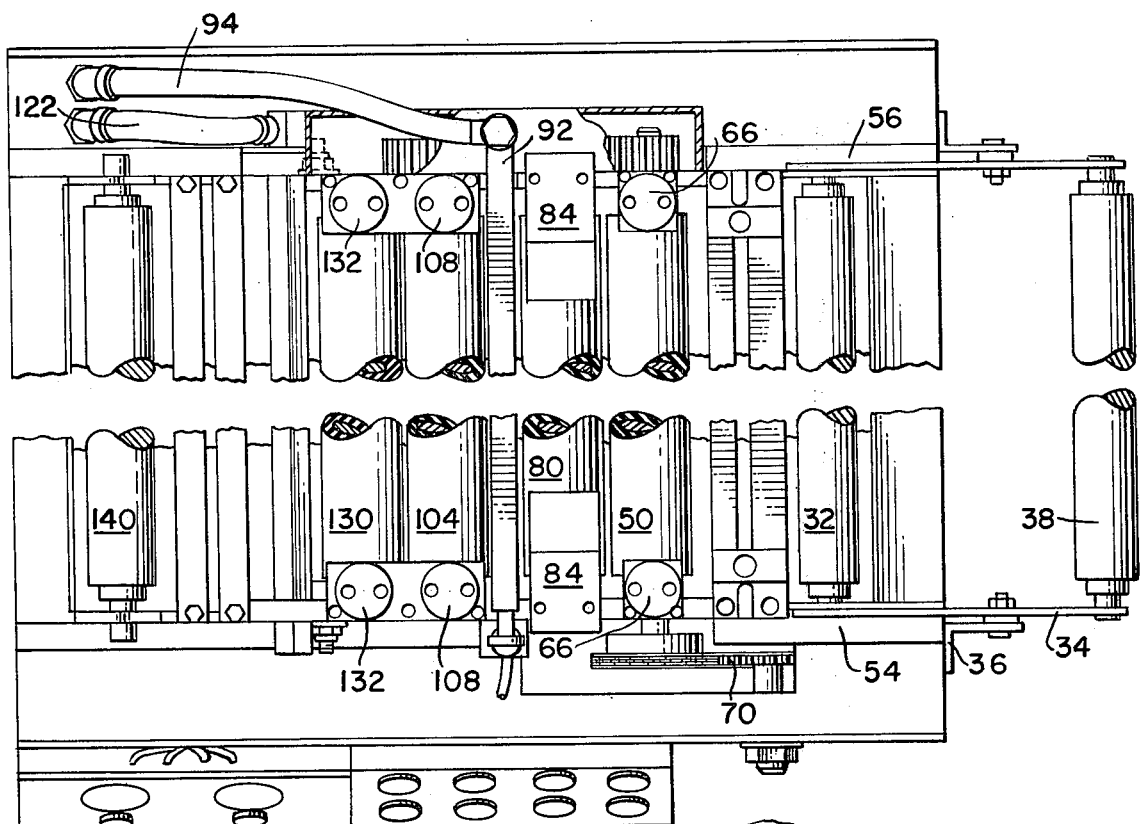

After passing over the guide roll 32, the metal strip 30 is received between steel pinch rolls 50 and 52 mounted between end plates 54 and 56 supported on base 22. More particularly, as best shown in FIG. 2, the lower pinch roll 52 is supported by shaft 58 rotatably carried in end plates 54 and 56. In order to provide adjustability with regard to the coaction and spacing between pinch rolls 50 and 52, the upper roll 50 has been made adjustable with respect to the lower roll 52. Roll 50 is provided with a shaft 60 mounted at each end in a bearing assembly 62 in turn connected to rod 64 of a pneumatic piston-cylinder assembly 66. Air pressure is applied to cylinder 68 of the assembly 66 by means of air pressure line 70. Movement of rod 64 is controlled by the pressure in cylinder 68 to thereby properly position roll 50 with respect to roll 52.

Rotation of pinch rolls 50 and 52 is provided by means of drive chain 70 connected to power means 20 by gear 72 and to shaft 58 by means of gear sprocket 74. Thus roll 52 is power rotated to engage the underside of the metal strip 30 for feed purposes and the upper pinch roll 50 engages the upper surface of the metal strip 30 in the manner of a back-up roll to insure needed frictional engagement between the metal strip and the pinch rolls to provide desired feed.

After leaving the pinch rolls 50-52, the upper surface of the metal strip 30 is engaged by straightening roll 80 also carried between end plates 54 and 56. The vertical disposition and adjustment of the straightening roll 80 is provided by adjusting units 84 at each end of the roll 80. Specifically, each adjusting unit 84 has a downwardly extending rod support 86 connected to rotating straightening roll 80, thus movement of the rods 86 control the positioning of the roll 80.

Figure 4:
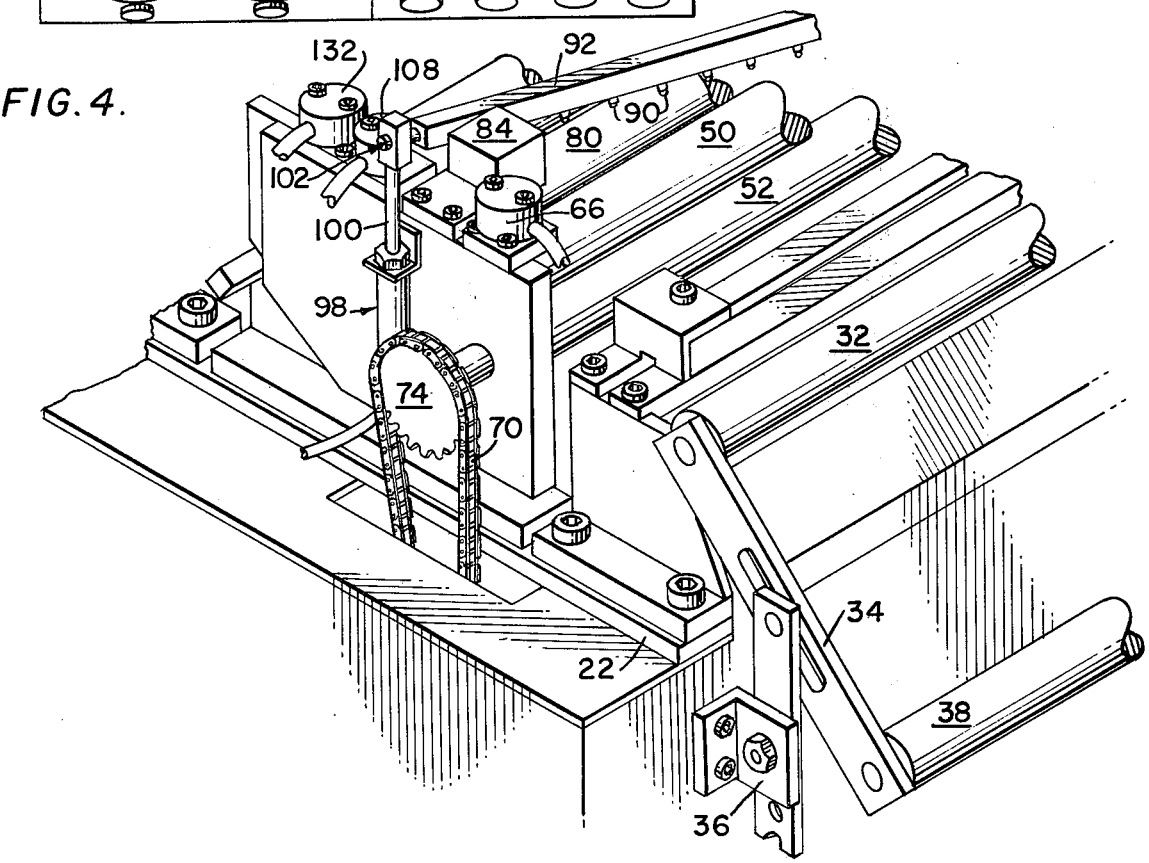

Immediately after the straightening action takes place, a lubricant is sprayed onto the upper surface of the metal strip 30 by means of nozzles 90 extending downwardly from manifold 92. The manifold is supplied with oil by means of tubing 94 connected to the lubricant reservoir 18 and associated pump 96. At times it may be desirable to empty the oil contained in manifold 92, as for example, when the machine is stopped. For this purpose, the manifold is tilted upwardly as shown in FIGS. 2 and 4 by means of a pneumatic piston-cylinder assembly 98 including a piston rod 100 connected to pin 102 at one end of the manifold 92. Upon upward tilting of the manifold the lubricant will flow therefrom back to the reservoir 18. Controls for operation of the assembly 98 could be found on the press which is being supplied with the lubricated metal strip. It should be noted that the manifold 92 is provided with a substantial number of nozzles 90 so that a very even spray of lubricant may be placed on the upper surface of the metal strip 30.

The metal strip with its upper surface covered with lubricant next passes between squeegee rolls 104 and 106 mounted between end plates 54 and 56 on base 22.

Both of these rolls are rubber covered to provide the requisite squeezing and removal of excess lubricant from the upper surface of the strip. The amount of pressure exerted by the squeegee rolls 104 and 106 on the metal strip to a substantial extent determine the amount of lubricant that will remain on the upper surface of the metal strip 30. In order to provide means for adjusting the pressure between the squeegee rolls, they are mounted in the same manner as the pinch rolls 50 and 52 wherein the lower roll 52 is rotatable in fixed position and the upper roll 50 is moved toward and away from roll 52 by pneumatic cylinder assemblies 66. With regard to upper squeegee roll 104 pneumatic cylinder assemblies 108 are provided to move roll 104 with respect to roll 106 to vary the pressure exerted on the metal strip 30 passing therebetween.

In order to lubricate the underside of the metal strip 30, after passing between squeegee rolls 104 and 106, the underside of the strip is contacted by bottom coating roll 110. As best shown in FIG. 1, nozzles 112 extending from lubricant manifold 114 direct lubricant into the nip 116 of rolls 110 and 120, both of which are rubber covered. Lubricant is thus deposited on bottom coating roll 110 which in turn contacts the underside of strip 30 to coat said surface with lubricant. Lubricant is fed to manifold 114 by means of tubing 122 receiving lubricant from the reservoir 18. In order to assure proper coating on the underside of strip 30, a back-up rubber covered roll 130 is positioned above and in contact with bottom coating roll 110. It is between back-up roll 130 and bottom coating roll 110 that the metal strip 30 passes. Here again, as in the pinch roll mounting arrangement, back up roll 130 is movable toward and away from the bottom coating roll 110 by means of pneumatic cylinder assemblies 132, thereby the desired pressure between rolls 110 and 130 may be produced to provide the final control of thickness of lubricant on both faces of the metal strip 30.

After passing between rolls 110 and 130, the metal strip 30 is discharged over guide roll 140 on its way to the press. Loop sensing means 150 may be provided beyond the guide roll 140, if desired.

As might be expected, in order for the oiling components to provide the requisite coating, it is necessary that the lubricant fed to these components be uniform with regard to flow and adherence qualities. In order to do this, the reservoir 18 is provided with heating element 160 controlled by thermostat 162.

In order to collect lubricant removed from the metal strip at various stages of operation and to further collect any excess lubricant coming from the lubricant dispensing nozzles, a collecting pan 24 is provided immediately beneath base 22. Oil collected in pan 24 is returned to reservoir 18 via tube 26 and filter 28.

It should be noted that the pass line between bottom coating roll 110 and back-up roll 130 is above the pass line between squeegee rolls 104 and 106. This arrangement assures that any excess of lubricant on the upper surface of the metal strip 30 will flow back toward the squeegee rolls 104 and 106 and thereby assure a proper coating control by back-up roll 130.

As previously described, pinch rolls 50 and 52 are powered by power means 20 through suitable mechanical means. The squeegee rolls 104 and 106 as well as rolls 110 and 130 are also power driven. Means are provided for coordinating drive speeds between all power driven rolls in order that the feed from one position to another will take place evenly. Such arrangements are well known in the prior art and do not constitute a part of the invention herein.

What I claim is:

1. A free standing strip oiler and feeder adapted to oil a strip on its upper and undersides and feed it to a press, said strip oiler and feeder comprising:
   a base assembly,
   power means associated with said base assembly,
   a coacting pair of pinch rolls adapted to receive and feed the strip positioned between the coacting surfaces of said pinch rolls,
   means connected to the power means for providing rotation to the pinch rolls,
   means for depositing oil on the upper surface of the strip, said means being positioned on the output side of the pinch rolls,
   a pair of squeegee rolls spaced from the oil depositing means and adapted to pass the strip between their coacting surfaces to smooth out the oil on the upper surface of the strip,
   means for applying oil to the underside of the strip adjacent the output side of the squeegee rolls, said means comprising a pair of coacting rolls positioned beneath the strip passing through the squeegee rolls, one of said coacting rolls being a coating roll in contact with the underside of the strip, means for projecting oil into the nip of said coacting rolls whereby a coating of oil will be formed on the coating roll for application to the underside of the strip, and
   a back-up roll coacting with the coating roll at the point where the strip contacts said coating roll whereby the oil coating on the upper surface of the strip is finally smoothed to desired thickness, the pass line defined by the place where the back-up roll and coating roll meet being higher than the pass line formed by the contact of the pair of squeegee rolls whereby excess oil on the strip will drain away from the back-up and coating rolls.

2. The invention as set forth in claim 1 and wherein means are provided for applying pressure to the back-up roll to control the final smoothing of the coating on the strip.

3. The invention as set forth in claim 2 and wherein means are provided for varying the pressure produced between the squeegee rolls.

4. The invention as set forth in claim 3 and wherein means are provided for controlling movement of the pinch rolls relative to their distance apart.

5. The invention as set forth in claim 4 and wherein the means for depositing oil on the upper surface of the strip comprises an oil fed manifold having a plurality of nozzles directing lubricant onto the upper surface of the strip.

6. The invention as set forth in claim 5 and wherein means are provided for tilting the oil fed manifold upwardly when strip feed stops to allow oil in the manifold to flow back to the reservoir and thus prevent flooding of the strip.

7. A free standing strip oiler and feeder adapted to oil a strip on both sides and feed it to a press, said strip oiler and feeder comprising:
   a base assembly,
   power means mounted on said base assembly,
   a guide roller adjustably carried on said base assembly and adapted to guide the strip riding thereover, a coacting pair of pinch rolls adapted to receive and feed the strip positioned between the coacting surfaces of said pinch rolls, means connecting the pinch rolls to the power means to provide rotation of the pinch rolls to feed the strip, a straightening roll positioned immediately adjacent the pinch rolls and adapted to bear against the upper surface of the strip passing through the pinch rolls, means for depositing oil to the upper surface of the strip, said oil depositing means being placed after the straightening roll, a pair of squeegee rolls spaced from the oil depositing means and adapted to pass the strip between them to smooth out the oil deposited on the upper surface of the strip, means for applying oil to the underside of the strip adjacent the squeegee rolls, said means comprising a pair of coacting rolls positioned beneath the strip passing through the squeegee rolls, one of said coacting rolls being a coating roll in contact with the underside of the strip, means for projecting oil into the nip of the coacting rolls whereby a coating of oil will be formed on the coating roll for application to the underside of the strip, a back-up roll coacting with the coating roll at the point where the strip contacts said coating roll whereby the oil coating on the upper surface is finally smoothed to desired thickness, the pass line defined by the place where the back-up roll and the coating roll make contact being higher than the pass line formed by contact of the pair of squeegee rolls whereby excess oil on both surfaces of the strip will drain away from the back-up and coating roll, and a guide roll to direct the oil coated strip from the oiler and feeder.

8. The invention as set forth in claim 7 and wherein an oil reservoir is provided for supplying oil to the means for applying oil to the strip and further wherein heating means are provided in the reservoir to heat the oil and a thermostat is associated with the oil and heating means to control the temperature of the oil.

9. The invention as set forth in claim 8 and wherein means are provided to collect the excess oil developed in the oiling operation and deliver it to the reservoir.

* * * * *